(12) United States Patent
Israelsson

(10) Patent No.: US 10,593,324 B2
(45) Date of Patent: Mar. 17, 2020

(54) METHOD AND SYSTEM FOR ENABLING A VEHICLE OCCUPANT TO REPORT A HAZARD ASSOCIATED WITH THE SURROUNDINGS OF THE VEHICLE

(71) Applicant: Volvo Car Corporation, Gothenburg (SE)

(72) Inventor: Erik Israelsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/483,452

(22) Filed: Apr. 10, 2017

(65) Prior Publication Data

US 2017/0301345 A1    Oct. 19, 2017

(30) Foreign Application Priority Data

Apr. 15, 2016    (EP) ..................................... 16165536

(51) Int. Cl.
*G10L 15/18*    (2013.01)
*G08B 25/01*    (2006.01)
(Continued)

(52) U.S. Cl.
CPC ........ *G10L 15/1822* (2013.01); *G08B 25/016* (2013.01); *G08G 1/096791* (2013.01);
(Continued)

(58) Field of Classification Search
CPC combination set(s) only.
See application file for complete search history.

(56) References Cited

U.S. PATENT DOCUMENTS 7,756,729 B2 *    7/2010    Wahlbin ................. G06Q 10/10
                                                            705/4
8,024,330 B1 *    9/2011    Franco .................... G06F 17/30
                                                            707/724
(Continued)

FOREIGN PATENT DOCUMENTS

EP    1739546 A2    1/2007
EP    2330578 A2    6/2011

OTHER PUBLICATIONS

Beshah et al., "Learning the Classification of Traffic Accident Types", 2012 Fourth International Conference on Intelligent Networking and Collaborative Systems. (Year: 2012).*

*Primary Examiner* — Neeraj Sharma
(74) *Attorney, Agent, or Firm* — Snyder, Clark, Lesch & Chung, LLP

(57) ABSTRACT

The present disclosure relates to a method performed by a hazard reporting system for enabling a vehicle occupant to, in an un-distractive and dynamic manner, report a hazard associated with the surroundings of a vehicle. The hazard reporting system receives a verbal hazard report from the vehicle occupant, which verbal hazard report comprises information related to a hazard associated with the surroundings of the vehicle. The hazard reporting system further transforms, with support from a speech recognition service, the verbal hazard report into a resulting machine-readable hazard report. The hazard reporting system further provides a data set comprising one or more hazard categories. Moreover, the hazard reporting system determines, when identifying a hazard category of the data set considered corresponding to the machine-readable hazard report, that the corresponding hazard category represents the hazard reported in the verbal hazard report.

13 Claims, 5 Drawing Sheets

1 Hazard reporting system

(51) Int. Cl.
*G10L 15/00* (2013.01)
*G08G 1/16* (2006.01)
*G08G 1/0967* (2006.01)
*G10L 25/54* (2013.01)
*B60Q 9/00* (2006.01)
*G10L 15/26* (2006.01)
*H04L 29/08* (2006.01)

(52) U.S. Cl.
CPC .............. *G08G 1/164* (2013.01); *G10L 15/00* (2013.01); *G10L 25/54* (2013.01); *B60Q 9/00* (2013.01); *G10L 15/265* (2013.01); *H04L 67/12* (2013.01)

(56) References Cited

U.S. PATENT DOCUMENTS

| | | | | |
|---|---|---|---|---|
| 9,128,981 | B1* | 9/2015 | Geer | G06F 17/30061 |
| 9,324,022 | B2* | 4/2016 | Williams, Jr. | G06N 3/0454 |
| 9,384,609 | B2* | 7/2016 | Ricci | B60Q 1/00 |
| 9,431,013 | B2* | 8/2016 | Reuter | G10L 15/20 |
| 9,620,143 | B2* | 4/2017 | Tanaka | G10L 21/06 |
| 9,701,265 | B2* | 7/2017 | Breed | B60R 16/037 |
| 9,759,570 | B2* | 9/2017 | Joao | G01C 21/34 |
| 9,792,361 | B1* | 10/2017 | Geer | G06F 17/30758 |
| 9,858,389 | B2* | 1/2018 | Donovan | G06F 19/3437 |
| 9,888,363 | B2* | 2/2018 | Addepalli | H04W 48/02 |
| 9,975,483 | B1* | 5/2018 | Ramaswamy | B60Q 11/00 |
| 10,008,201 | B2* | 6/2018 | Talwar | G10L 15/04 |
| 2008/0255754 | A1* | 10/2008 | Pinto | G01C 21/3691 701/119 |
| 2009/0023422 | A1* | 1/2009 | MacInnis | H04M 1/66 455/411 |
| 2009/0023428 | A1* | 1/2009 | Behzad | G06F 17/30032 455/414.3 |
| 2009/0191513 | A1* | 7/2009 | Wang | G09B 9/052 434/69 |
| 2010/0030738 | A1* | 2/2010 | Geer | G06F 17/30026 707/760 |
| 2010/0207787 | A1* | 8/2010 | Catten | G06F 17/30241 340/905 |
| 2010/0313148 | A1* | 12/2010 | Hochendoner | G06F 3/0481 715/759 |
| 2011/0258228 | A1* | 10/2011 | Uchiyama | G01C 21/3608 707/770 |
| 2013/0191132 | A1* | 7/2013 | Tanaka | G10L 21/06 704/275 |
| 2013/0226369 | A1* | 8/2013 | Yorio | G06F 17/00 701/1 |
| 2013/0246041 | A1* | 9/2013 | Costa | 704/2 |
| 2013/0302758 | A1* | 11/2013 | Wright | G07C 5/008 434/65 |
| 2014/0058730 | A1* | 2/2014 | Costa | G10L 15/265 704/235 |
| 2014/0306834 | A1* | 10/2014 | Ricci | B60Q 1/00 340/902 |
| 2014/0309872 | A1* | 10/2014 | Ricci | H04W 48/04 701/36 |
| 2015/0056951 | A1* | 2/2015 | Talwar | H04W 4/12 455/411 |
| 2015/0378715 | A1* | 12/2015 | Solnit | G06F 8/65 |
| 2016/0036899 | A1* | 2/2016 | Moody | G06Q 10/0637 709/217 |
| 2016/0071399 | A1* | 3/2016 | Altman | G10L 15/02 340/539.11 |
| 2016/0098990 | A1* | 4/2016 | Berke | G10L 15/22 |
| 2016/0182707 | A1* | 6/2016 | Gabel | H04M 1/72541 455/404.2 |
| 2016/0184703 | A1* | 6/2016 | Brav | A63F 13/285 |
| 2016/0266733 | A1* | 9/2016 | Alon | G06F 3/0481 |
| 2016/0325677 | A1* | 11/2016 | Fitch | B60R 1/04 |
| 2016/0358081 | A1* | 12/2016 | Cama | G06N 5/04 |
| 2016/0373578 | A1* | 12/2016 | Klaban | H04M 3/5116 |
| 2017/0016739 | A1* | 1/2017 | Matsui | G01C 21/3608 |
| 2017/0017766 | A1* | 1/2017 | Giraud | G06F 19/3418 |
| 2017/0024088 | A1* | 1/2017 | La Pean | G06F 3/0482 |
| 2017/0046216 | A1* | 2/2017 | Stenneth | G06F 11/0793 |
| 2017/0076597 | A1* | 3/2017 | Beattie, Jr. | B60K 35/00 |
| 2017/0109828 | A1* | 4/2017 | Pierce | G06Q 40/08 |
| 2017/0205246 | A1* | 7/2017 | Koenig | G01C 21/3682 |
| 2017/0230808 | A1* | 8/2017 | Ros | H04W 4/22 |
| 2017/0267100 | A1* | 9/2017 | Beattie, Jr. | B60K 35/00 |
| 2017/0316698 | A1* | 11/2017 | Stenneth | G08B 25/007 |
| 2017/0320452 | A1* | 11/2017 | Naboulsi | G06F 17/00 |
| 2017/0328719 | A1* | 11/2017 | Yamamuro | G01C 21/26 |
| 2017/0339366 | A1* | 11/2017 | Park | H04N 5/60 |

* cited by examiner

METHOD AND SYSTEM FOR ENABLING A VEHICLE OCCUPANT TO REPORT A HAZARD ASSOCIATED WITH THE SURROUNDINGS OF THE VEHICLE

TECHNICAL FIELD

The present disclosure relates to a hazard reporting system and a method performed therein, for enabling a vehicle occupant to in an un-distractive and dynamic manner report a hazard associated with the surroundings of a vehicle.

BACKGROUND

With a constant aim of making vehicles and driving of vehicles safer, there is a continuous strive for developing and implementing features supporting the vehicle and/or vehicle driver in driving more safely, and/or in avoiding potential dangerous situations. For instance, it is widely supported to, via cloud-based systems, allow vehicles to share safety-related data over the cell network. Such safety-related data commonly rely on sensor generated data, for instance detection of slippery road conditions, derived from vehicle sensor systems. There are, however, numerous safety-related traffic aspects that are not easily detected by vehicle sensor systems. User-generated data, for instance incident reports generated by the vehicle driver, is therefore a relevant source of information as a compliment to automatically generated sensor data.

Waze®, provided by Google, for instance, allows a user to report incidents such as accidents and traffic jams, by means of e.g. a smartphone. The user may via the touch display thereof type down and/or text the incident he or she would like to report, and/or scroll through a predefined menu to potentially find and subsequently select an incident alternative coinciding with the incident observed.

However, when it comes to the user simultaneously driving a vehicle, the user—in this case the driver—should preferably stay focused on driving. Thus, a user-generated report—in this case a driver-generated report—created by means of e.g. texting and/or scrolling as discussed above, may potentially be hazardous, since texting and/or scrolling may be distracting to the driver. It may further be assumed that it is not likely that the driver would stop the vehicle to generate the report; rather he/or she would commonly omit to report the incident.

Moreover, a predefined menu of selectable incident options provides that a predefined set of incidents are available for selection. Accordingly, any incident—commonly referred to as hazard—observed by the driver, not comprised in the predefined set, will not be reported, meaning lost safety reports and nuisance to the reporting driver when not finding a suitable incident alternative in the menu.

SUMMARY OF THE INVENTION

It is therefore an object of embodiments herein to provide an approach for enabling a vehicle occupant to in art un-distractive and dynamic manner report an observed hazard.

According to a first aspect of embodiments herein, the object is achieved by a method performed by a hazard reporting system for enabling a vehicle occupant to in an un-distractive and dynamic manner report a hazard associated with the surroundings of a vehicle. The hazard reporting system receives a verbal hazard report from the vehicle occupant, which verbal hazard report comprises information related to a hazard associated with the surroundings of the vehicle. The hazard reporting system further transforms—with support from a speech recognition service, and optionally a voice recognition service—the verbal hazard report into a resulting machine-readable hazard report. Moreover, the hazard reporting system provides a data set comprising one or more hazard categories. When the hazard reporting system identities a hazard category of the data set considered corresponding to the machine-readable hazard report, then the hazard reporting system determines that the corresponding hazard category represents the hazard reported in the verbal hazard report.

Thereby, an approach is provided which enables a safety-related incident related to the near environment of a vehicle—such as a wild animal standing next to the road along which the vehicle is travelling—to be reported by an occupant thereof—e.g. the driver—in a safe and non-restrictive manner, without taking greater focus from driving the vehicle. That is, since the hazard reporting system receives a verbal hazard report from the vehicle occupant, which verbal hazard report comprises information related to a hazard associated with the surroundings of the vehicle, a hazard report relating to a safety-related incident observed by the vehicle occupant is received, which hazard report is verbally and/or orally provided by the vehicle occupant. Accordingly, the hazard report is reported in a manner un-distractive to the vehicle occupant, without him or her needing to in a commonly known manner interact with a touch display e.g. texting a message and/or scrolling through a pre-defined set of hazards, to be able to report the hazard. Furthermore, as a result of the hazard report being verbally reported, the vehicle occupant is not restricted to make a selection from a pre-defined set of hazards for instance provided in a structure menu of a touch display. Moreover, since the hazard reporting system furthermore transforms—with support from a speech recognition service—the verbal hazard report into a resulting machine-readable hazard report, the verbally reported hazard report is interpreted into a machine-readable, for instance textual, hazard report. Furthermore, since the hazard reporting system moreover provides a data set comprising one or more hazard categories, there is made available a data set comprising categories of different hazards a vehicle occupant may presumably observe and/or be subjected to, for instance "wild animal", "road damage", "flooding", "object on road", etc. Since the hazard reporting system furthermore determines—when the hazard reporting system identifies a hazard category of the data set considered corresponding to the machine-readable hazard report—that the corresponding hazard category represents the hazard reported in the verbal hazard report, a hazard category of the data set is—if said hazard category is deemed to correspond to the machine-readable hazard report—selected to represent the reported hazard of the verbal hazard report. Accordingly, provided that the reported hazard comprised in the verbal hazard report is correctly interpreted in the transformation from the verbal hazard report into the computer-readable hazard report, and furthermore that a hazard category is considered to correspond to the machine-readable hazard report, then said hazard category is selected to represent the verbally reported hazard. Consequently, it may thereby be concluded which safety-related incident that has been reported by the vehicle occupant. This approach thus allows a safety-related incident to be collected from e.g. a vehicle driver without negative effects, and the approach is accordingly superior to solutions based on e.g. smartphone applications that require the vehicle driver to interact with the phone, since such solutions may distract the vehicle driver and increase the risk of a potential accident—a counterproductive consequence for a solution aimed at increasing road safety.

For that reason, an approach is provided for enabling a vehicle occupant to in an un-distractive and dynamic manner report an observed hazard.

The technical features and corresponding advantages of the above mentioned method will be discussed in further detail in the following.

By introducing a method performed by a hazard reporting system for enabling a vehicle occupant to in an un-distractive and dynamic manner report a hazard associated with the surroundings of a vehicle, a safety-related incident related to the near environment of a vehicle—such as a wild animal standing next to the road along which the vehicle is travelling—may be reported by an occupant thereof—e.g. the driver—in a safe and non-restrictive manner, without taking greater focus from driving the vehicle. "Vehicle" may refer to any arbitrary vehicle, for instance an engine-propelled vehicle such as e.g. a car, truck, lorry, van, bus, tractor, military vehicle, vessel, boat etc., or a rail-bound vehicle, such as e.g. a train or train. Moreover, "vehicle occupant" may refer to any arbitrary person positioned in said vehicle, for instance the driver thereof. Moreover, the expression hazard "associated with" the surroundings may refer to hazard "observed in", "in" and/or "valid in" the surroundings, whereas "the surroundings of a vehicle" may refer to "the surroundings of a vehicle visual to the vehicle occupant" and/or "the vicinity of a vehicle." "Hazard" may refer to "driving-related hazard", "observed hazard", "hazardous incident and/or event" and/or "safety-related incident and/or event", whereas the expression "report a hazard" may refer to "provide a hazard report indicative of a hazard." The expression "in an un-distractive manner" may refer to "in a safe manner" and/or "in a manner not requiring the vehicle occupant to interact with a touch display and/or scroll/click through a menu structure", whereas the expression "dynamic manner" may refer to "in an non-restrictive manner" and/or "in a manner not limited by a pre-defined set of hazards." "Enabling" may refer to "supporting." The expression "for enabling a vehicle occupant to in an un-distractive and dynamic manner report a hazard", may according to an example refer to "for enabling a vehicle occupant to in an un-distractive and dynamic manner report a hazard, and handling of the reported hazard", and according to another example refer to "for supporting handling of a vehicle occupant provided hazard report indicative of a hazard." The "hazard reporting system" may fully and/or at least partly be comprised in one or more servers—such as in a commonly known cloud to which vehicles may be wirelessly connected—for instance in an exemplifying hazard reports control server. The hazard reporting system may further optionally be distributed at least partly to the vehicle, for instance to one or more nodes—such as ECUs ("Electronic control modules")—thereof.

Since the hazard reporting system receives a verbal hazard report from the vehicle occupant, which verbal hazard report comprises information related to a hazard associated with the surroundings of the vehicle, a hazard report relating to a safety-related incident observed by the vehicle occupant is received, which hazard report is verbally and/or orally provided by the vehicle occupant. Accordingly, the hazard report is reported in a manner un-distractive to the vehicle occupant, without him or her needing to in a commonly known manner interact with a touch display e.g. texting a message and/or scrolling through a pre-defined set of hazards, to be able to report the hazard. Moreover, since the hazard report is verbally reported, the vehicle occupant is not restricted to make a selection from a pre-defined set of hazards for instance provided in a structure menu of a touch display. The expression "verbal" hazard report may refer to "verbally reported" hazard report, whereas "hazard report" throughout this disclosure may refer to "piece of information indicative of a hazard." "From" the vehicle occupant may refer to "reported by" and/or "verbally reported by" the vehicle occupant. The expression hazard report "comprising" information may refer to hazard report "holding and/or containing" information, whereas information "related to" a hazard may refer to information "indicative of and/or indicating." The hazard report may for instance be reported by the vehicle occupant by means of one or more commonly known microphones provided in the vehicle, and then subsequently received and/or derived by the hazard reporting system. "Receiving" may throughout this disclosure refer to "deriving" and/or "obtaining", and further to "receiving by means of a hazard reports control server." A verbal hazard report may for instance refer to a verbal expression such as "There is a moose on the road!", "Animals on the road!", "Wow, almost hit an elk", "Please watch out for the herd of reindeer along in the area", "Huge bump!", "Dangerous pothole!", "Watch out for the sinkhole!", "Debris all over the place!", "Some moron left a tyre on the roadside!", "A rim is lying around in the right lane!", etc.

Since the hazard reporting system furthermore transforms—with support from a speech recognition service and optionally a voice recognition service—the verbal hazard report into a resulting machine-readable hazard report, the verbal hazard report is interpreted into a machine-readable hazard report, for instance a textual hazard report. The "speech recognition service"—which is adapted to be capable of interpreting and/or encoding the spoken words of the vehicle occupant, i.e. the verbal hazard report—may be represented by any arbitrary speech recognition service known in the art, such as commonly known Cortana provided by Microsoft, Siri provided by Apple, Now provided by Google, and/or any equivalent and/or successor thereof. "Speech" may throughout this disclosure refer to "voice." Moreover, the optional "voice recognition service" may refer to any arbitrary known service adapted to identifying the speaker, rather than what they are saying. Recognizing the speaker can simplify the task of translating speech in systems that have been trained on a specific person's voice or it can be used to authenticate or verify the identity of a speaker as part of a security process. Transforming the verbal hazard report may for instance take place in said hazard reports control server, and "transforming" may subsequently for instance refer to "transforming by means of the hazard reports control server." "Transforming" may further refer to "interpreting" or "producing a waveform, signal, or data file." The expression transforming "the verbal hazard report" may refer to transforming "at least a portion of the verbal hazard report." "At least a portion of" may throughout this disclosure refer to "at least partly" and/or "one or more words of." Moreover, "machine-readable" may throughout refer to "textual", and furthermore to a "textual", "acoustic", "electrical", "magnetic" or "optical" signal, or any other data or metadata that is in a format that may be understood by a machine.

Since the hazard reporting system moreover provides a data set comprising one or more hazard categories, there is made available a data set comprising categories of different hazards a vehicle occupant may presumably observe and/or be subjected to, for instance "wild animal", "road damage", "flooding," "object on road", etc. The data set—for instance a data table and/or data matrix comprising plural data elements e.g. computer-readable elements—may initially be pre-defined, and may further for instance reside in the hazard reports control server discussed above. "Hazard category" may for instance refer to "hazard classification", whereas the expression "providing" a data set may refer to "enabling, enabling access to, and/or making available" a data set and/or "providing by means of the hazard reports control server" a data set.

Since the hazard reporting system furthermore determines—when the hazard reporting system identifies a hazard category of the data set considered corresponding to the machine-readable hazard report—that the corresponding hazard category represents the hazard reported in the verbal hazard report, a hazard category of the data set is—if said hazard category is deemed to correspond to the machine-readable hazard report—selected to represent the reported hazard of the verbal hazard report. Accordingly, provided that the reported hazard comprised in the verbal hazard report is correctly interpreted in the transformation from the verbal hazard report into the computer-readable hazard report, and furthermore that a hazard category is considered to correspond to the machine-readable hazard report, then said hazard category is selected to represent the verbally reported hazard. Consequently, it may thereby be concluded which safety-related incident that has been reported by the vehicle occupant. This approach thus allows a safety-related incident to be collected from e.g. a vehicle driver without negative effects, and the approach is accordingly superior to solutions based on e.g. smartphone applications that require the vehicle driver to interact with the phone, since such solutions may distract the vehicle driver and increase the risk of a potential accident—a counterproductive consequence for a solution aimed at increasing road safety. "Determining that the corresponding hazard category represents the hazard" may refer to "selecting the corresponding hazard category to represent the hazard" and/or "determining by means of the hazard reports control server that the corresponding hazard category represents the hazard." "Represents" may refer to "is selected to represent", "symbolizes", "constitutes" and/or "corresponds to." Moreover, "when identifying" may throughout this disclosure refer to "if identifying" and/or "only when identifying", whereas "identifying" throughout may refer to "finding" and/or "determining." "Considered corresponding" may throughout this disclosure refer to "considered by analysis and/or comparison to correspond" and/or "determined and/or estimated to correspond", whereas "corresponding to" and/or "corresponding" throughout may refer to "matching."

Optionally, the hazard reporting system applies a classification model associated with the data set, to the machine-readable hazard report, which classification model is adapted to attempt to classify the machine-readable hazard report into a hazard category considered corresponding to the machine-readable hazard report. Thereby, a classification mechanism is provided capable of categorizing—or potentially categorizing—the machine-readable hazard report into a hazard category deemed to correspond to the machine-readable hazard report, thus deemed to correspond to the verbally reported hazard of the verbal hazard report. The classification model may rely on a structure, e.g. an initial structure, comprising a set of assumed, expected and/or previously reported safety-related machine-readable expressions, representing expected and/or similar content as that of a prospective machine-readable hazard report, and a correct or deemed correct classification of said safety-related expressions into corresponding hazard categories of the data set. The classification model is pre-trained and/or trained based on said structure, i.e. the classification model may be represented by a function inferred from the safety-related expressions and their correct classifications, such that a prospective machine-readable hazard report subsequently may be classified by the classification model into a hazard category considered corresponding to the machine-readable hazard report. "Prospective" hazard report may refer to "future", "unseen" and/or "yet to come" hazard report. "Applying a classification model to the machine-readable hazard report" may refer to "subjecting and/or exposing the machine-readable hazard report to a classification model" and/or "applying by means of the hazard reports control server a classification model to the machine-readable hazard report." Moreover, "a classification model" may refer to "a classification mechanism" and/or "one or more classification algorithms and/or functions", and further to "a classification model trained by machine learning and/or supervised learning." "Associated with" the data set may refer to "applicable for", "trained for", "adapted for" and/or "configured for" the data set. Furthermore, the expression applying a classification model "to the machine-readable hazard report" may refer to applying a classification model "to at least a portion of the machine-readable hazard report." "Adapted to attempt to classify" may refer to "trained to attempt to classify" and/or "adapted to try to classify", and further to "adapted to classify." "Classify" may refer to "categorize", and further to "interpret and classify." Moreover, "classify the machine-readable hazard report into a hazard category considered corresponding to the machine-readable hazard report", may refer to "classify the machine-readable hazard report into a hazard category considered corresponding to the machine-readable hazard report, wherein a hazard category is considered corresponding when selected by said classification model."

Further, optionally, when not able to classify the machine-readable hazard report into one of the hazard categories, the hazard reporting system may enable the machine-readable hazard report to be utilized for training the classification model. Thereby, the un-classifiable machine-readable hazard report may be added to e.g. the safety-related expressions of the structure discussed above, and utilized for training and/or re-training of the classification model, possibly utilizing supervised learning and/or machine learning. Accordingly, commonly known machine learning and/or supervised learning may be utilized for continued improvement of the classification model, as new hazard reports verbally reported by vehicle occupants may provide a continuous stream of sample data for the training and evaluation of the classification model. The classification model may optionally rate the estimated confidence of correct classification of the machine-readable hazard report. Moreover, potentially, the un-classifiable hazard report may lead to that a new hazard category may need to be defined in the data set. The expression "not able to classify" may refer to "not able to confidently classify" and/or "not able to classify, with a confidence level above a predetermined confidence level threshold." The optional "confidence level" may refer to the degree of confidence in the classification of the hazard report, expressed for instance in percentage where 100% is a maximum confidence level, and the optional "confidence level threshold" may refer to a pre-set threshold to which the confidence level may be compared in order to potentially filter out hazard reports with relatively low confidence levels. The optional predetermined "confidence level threshold"—which may be adjustable—may for instance be set to exemplifying 75%, 85% or 95%. Moreover, 'enable' may refer to "provide", whereas "training" may refer to "retraining." The expression "enable the machine-readable hazard report to be utilized for training the classification model" may refer to "enable at least a portion of the machine-readable hazard report to be utilized for training the classification model" and/or "enable, by means of the hazard reports control server, the machine-readable hazard report to be utilized for training the classification model."

Optionally, at least a first hazard category comprises one or more differing machine-readable elements. The hazard reporting system then further compares the resulting machine-readable hazard report to one or more machine-readable elements of the data set. The hazard reporting system then further determines—when identifying a machine-readable element considered matching the machine-readable hazard report—that a hazard category comprising the matching machine-readable element, is considered corresponding to the machine-readable hazard report. Thereby, by at least a first hazard category comprising one or more differing machine-readable elements, various elements may be sub-elements to the respective one or more hazard categories. Moreover, thereby, by the hazard reporting system then further comparing the resulting machine-readable hazard report to one or more machine-readable elements of the data set, the verbally reported hazard in the verbal hazard report is—after having been transformed into a machine-readable hazard report—compared to various posts of the hazard categories. Moreover, thereby, by the hazard reporting system then further determining—when identifying a machine-readable element considered matching the machine-readable hazard report—that a hazard category comprising the matching machine-readable element is considered corresponding to the machine-readable hazard report, a hazard category of the data set is—if an element comprised in said hazard category is deemed to match the hazard report—established to be considered to correspond to the machine-readable hazard report. The expression "hazard category comprising one or more differing machine-readable elements" may refer to "hazard category comprising a digital sub-set of one or more differing machine-readable elements." Moreover, "comprising" may here refer to "containing" and/or "holding", whereas "differing" may refer to "various" and/or "different." "Elements" of the data set may refer to "fields" and/or "posts" of the data set, and further to "data elements" of the data set. The expression "comparing the resulting hazard report" may refer to "comparing at least a portion of the resulting hazard report" and/or "comparing, by means of the hazard reports control server, the resulting hazard report." Moreover, the expression "comparing the resulting machine-readable hazard report to one or more machine-readable elements of the data set" may refer to "comparing text, signs and/or characters of the resulting machine-readable hazard report to text, signs and/or characters of one or more machine-readable elements of said data set" and/or expression "comparing, by means of the hazard reports control server, the resulting machine-readable hazard report to one or more machine-readable elements of the data set." "Identifying an element considered matching the hazard report" may refer to "identifying an element corresponding to, essentially matching, and/or at least partly matching the hazard report" and/or "identifying, by means of the hazard reports control server, an element considered matching the hazard report." Moreover, "considered matching" may refer to "considered by analysis and/or comparison to match" and/or "determined and/or estimated to match." The exemplifying hazard category "wild animal" discussed above, may for instance comprise exemplifying machine-readable elements "moose", "elk", "deer", etc. Similarly, the exemplifying hazard category "road damage" discussed above may comprise exemplifying machine-readable elements "bump", "pothole", "sinkhole", etc., whereas the exemplifying hazard category "object on road" discussed above may comprise exemplifying machine-readable elements "debris", "tyre", "rim", etc. The number of machine-readable elements in respective hazard category may naturally vary.

Optionally, when not able to identify a machine-readable element considered matching the machine-readable hazard report, the hazard reporting system may further update the data set to comprise a machine-readable element corresponding to the machine-readable hazard report. Thereby, the un-classifiable machine-readable hazard report—or a portion thereof—may be added to be comprised in a new and/or already available hazard category of the data set. "Updating" the data set may refer to "complementing" and/or "adding to" the data set, and further to "updating by means of the hazard reports control server", whereas element "corresponding to" may refer to element "representing." Moreover, element corresponding "to the hazard report" may refer to element corresponding "to at least a portion of the hazard report." The expression "not able to identify" may refer to "not able to confidently identify."

According to an example, the hazard reporting system may further determine—for one or more of the machine-readable elements discussed above—a respective match level indicating to what extent at least a portion of the machine-readable element coincides with the machine-readable hazard report, and further determine that the machine-readable element with the highest match level is a matching machine-readable element, provided that the match level reaches a predetermined match level threshold. The optional "match level" may refer to the degree of matching of the hazard report to an element, expressed for instance in percentage where 100% is a complete match, and the optional "match level threshold" may refer to a pre-set threshold to which the match level may be compared in order to potentially filter out hazard reports with relatively low match levels. The optional predetermined "match level threshold"—which may be adjustable—may for instance be set to exemplifying 75%, 85% or 95%. The expression "not able to identify" may then additionally refer to "not able to identify, with a match level above a predetermined match level threshold."

Optionally, the hazard reporting system may further receive vehicle data of the vehicle, which vehicle data comprises at least a position and/or a travel direction of the vehicle, valid at a time instant of receiving the verbal hazard report. Thereby, relevant vehicle data—including at least the position and/or travel direction of the vehicle—valid at the time of receiving the verbal hazard report, may additionally be received. Accordingly, the received verbal hazard report is complemented and/or combined with received digital vehicle data relevant for the reported hazard. "Receiving" vehicle data may refer to "deriving" vehicle data, whereas "data" here may refer "metadata." Moreover, "receiving vehicle data of the vehicle" may refer to "receiving vehicle data of the vehicle over a data channel" and/or "receiving vehicle data of the vehicle, by means of said hazard reports control server, via a data channel." "Vehicle data" may refer to "current vehicle data", and furthermore to "safety-related, position-related and/or direction-related vehicle data." Vehicle "data" may refer to vehicle "parameters." Moreover, "position" of the vehicle may refer to "geographical position" of the vehicle, whereas "travel direction" of the vehicle may refer to "horizontal travel direction" of the vehicle. The position and/or travel direction of the vehicle may be determined and subsequently derived as commonly known in the art, for instance with support from a positioning system on-board the vehicle, and furthermore potentially with support from wireless communication with the optional hazard reports control server discussed above. "Valid" at a time instant may refer to "effective" at a time instant, whereas "valid at a time instant of receiving" may refer to "valid at essentially a time instant of receiving."

Furthermore, optionally, the hazard reporting system may additionally provide a warning message to at least a second vehicle and/or an entity. The warning message then comprises and/or is then based on the corresponding machine-readable element, and the warning message then further comprises information based on the vehicle data. Moreover, the at least second vehicle and/or entity is then selected based on the vehicle data. Thereby, other vehicles and/or entities may be informed of the reported hazard, and thus take action based thereon. For instance, other vehicles in geographical nearness of the reported hazard may upon receiving the warning message choose to take another route to avoid the reported hazard and/or pay more attention when passing the area of the reported hazard. Similarly, an entity such as a road authority may upon receiving the warning message be able to expediently take action to address the reported hazard. "Providing" a warning message may refer to "providing over a data channel" a warning message, and further to "providing by means of said hazard reports control system" a warning message. Moreover, "providing" may refer to "digitally providing, "sending", "transmitting" and/or "submitting", whereas warning "message" may refer to warning "report" and/or warning "information." "Entity" may refer to any arbitrary physical entity, such as for instance a road authority. The expression "warning message comprises and/or is based on the corresponding machine-readable hazard category" may refer to "warning message is derived from the corresponding machine-readable hazard category." Furthermore, the expression "warning message further comprises information based on the vehicle data" may refer to "warning message further comprises at least the position and/or travel direction of the vehicle." Moreover, "being selected based on the vehicle data" may refer to "being selected if closer than a maximum distance threshold from said position and/or if estimated to arrive at said position faster than a maximum time threshold, and/or if travelling in a travel direction essentially coinciding with said travel direction of the vehicle." The optional maximum distance threshold and/or optional maximum time threshold may be arbitrarily set and adjusted, depending on the conditions at hand.

According to an example, the hazard reporting system may further determine that an ability to receive a verbal hazard report has been activated. Such an activation may for instance take place by means of a vehicle occupant verbal command, such as a vehicle occupant verbally speaking the exemplifying word "report", and/or vehicle occupant activation of a SW- and/or HW-button.

According to a second aspect of embodiment herein, the object is achieved by a hazard reporting system adapted for enabling a vehicle occupant to in an un-distractive and dynamic manner report a hazard associated with the surroundings of a vehicle. The hazard reporting system comprises a verbal report receiving unit adapted for receiving a verbal hazard report from the vehicle occupant, which verbal hazard report comprises information related to a hazard associated with the surroundings of the vehicle. The hazard reporting system further comprises a VTT ("Voice to text") transforming unit adapted for transforming with support from a speech recognition service and optionally a voice recognition service, the verbal hazard report into a resulting machine-readable hazard report. Moreover, the hazard reporting system comprises a data table providing unit adapted for providing a data set comprising one or more hazard categories. The hazard reporting system further comprises an identifying unit adapted for identifying a hazard category of the data set considered corresponding to the machine-readable hazard report. Moreover, the hazard reporting system comprises a determining unit adapted for determining—when a hazard category of the data set considered corresponding to the machine-readable hazard report has been identified—that the corresponding hazard category represents the hazard reported in the verbal hazard report.

Optionally, the hazard reporting system further comprises a classification model applying unit adapted for applying a classification model associated with the data set to the machine-readable hazard report. The classification model is adapted to attempt to classify the machine-readable hazard report into a hazard category considered corresponding to the machine-readable hazard report.

Furthermore, optionally, the hazard reporting system may further comprise a model training enabling unit adapted for enabling—when the machine-readable hazard report not has been classified into one of the hazard categories—the machine-readable hazard report to be utilized for training the classification model.

Alternatively, optionally, at least a first hazard category may comprise one or more differing machine-readable elements. The identifying unit is then further adapted for comparing the resulting machine-readable hazard report to one or more machine-readable elements of the data set. Moreover, the identifying unit is then further adapted for identifying a machine-readable element considered matching the machine-readable hazard report. Furthermore, the determining unit is then further adapted for determining—when a machine-readable element considered matching the machine-readable hazard report has been identified—that a hazard category comprising the matching machine-readable element, is considered corresponding to the machine-readable hazard report.

Furthermore, optionally, the hazard reporting system may further comprise a data set updating unit adapted for updating—when a machine-readable element considered matching the machine-readable hazard report not has been identified—the data set to comprise a machine-readable element corresponding to the machine-readable hazard report.

Optionally, the hazard reporting system may further comprise a vehicle data receiving unit adapted for receiving vehicle data of the vehicle, which vehicle data comprises at least a position and/or a travel direction of the vehicle valid at a time instant of receiving the verbal hazard report.

Furthermore, optionally, the hazard reporting system may further comprise a warning message providing unit adapted for providing a warning message to at least a second vehicle and/or an entity. The warning message then comprises and/or is then based on the corresponding machine-readable hazard category and the warning message then further comprises information based on the vehicle data. Moreover, the at least second vehicle and/or entity is then selected based on the vehicle data.

Similar advantages as those mentioned in the foregoing in relation to the first aspect correspondingly apply to the second aspect, which is why these advantages are not further discussed.

According to a third aspect of embodiments herein, the object is achieved by a computer program product comprising a computer program containing computer program code means arranged to cause a computer or a processor to execute the steps of the hazard reporting system discussed above, stored on a computer-readable medium or a carrier wave. Yet again, similar advantages as those mentioned in the foregoing in relation to the first aspect correspondingly apply to the third aspect, which is why these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which.

DETAILED DESCRIPTION

Figure 1:
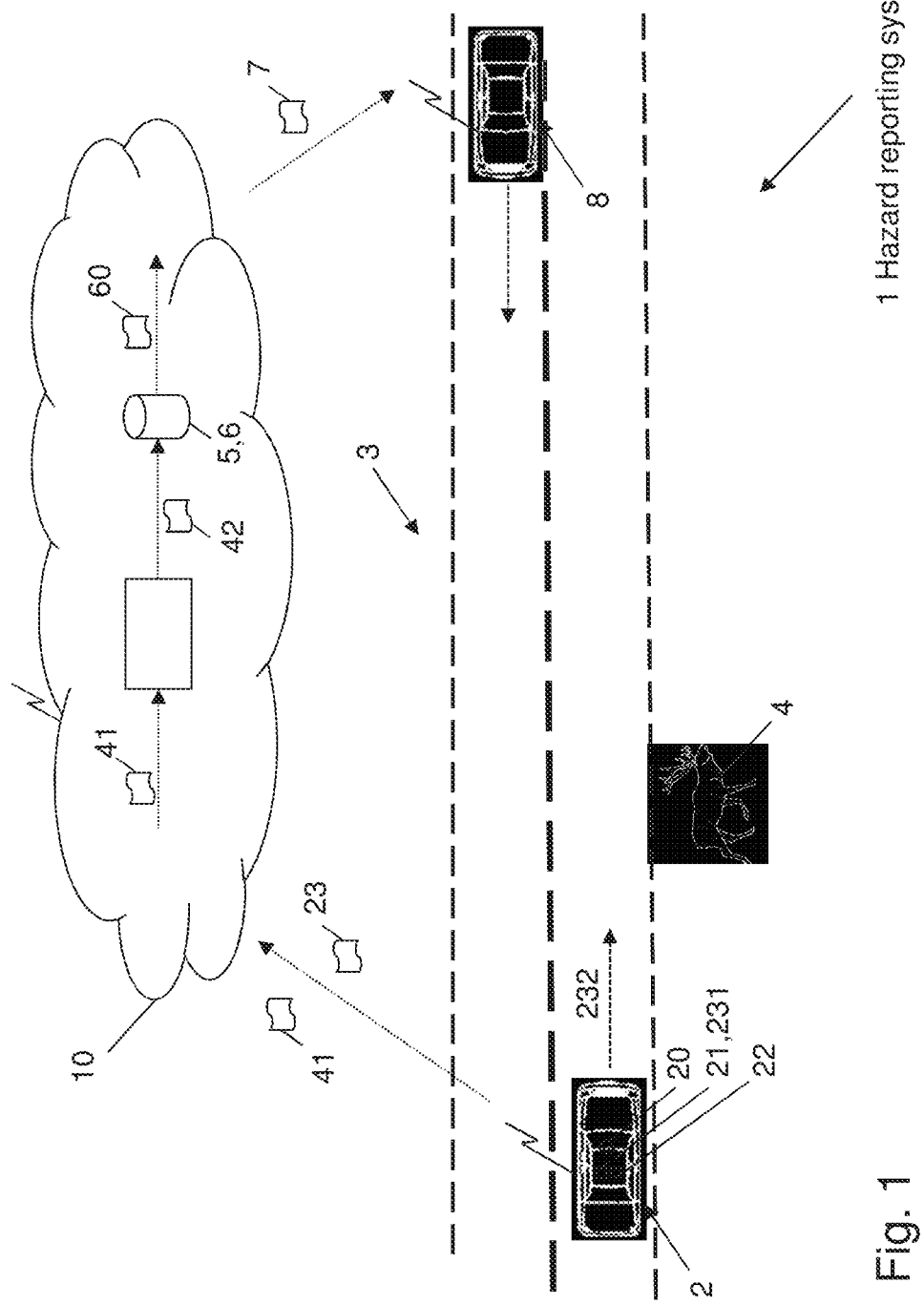
FIG. 1 illustrates a schematic overview of an exemplifying hazard reporting system according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

Figure 2:
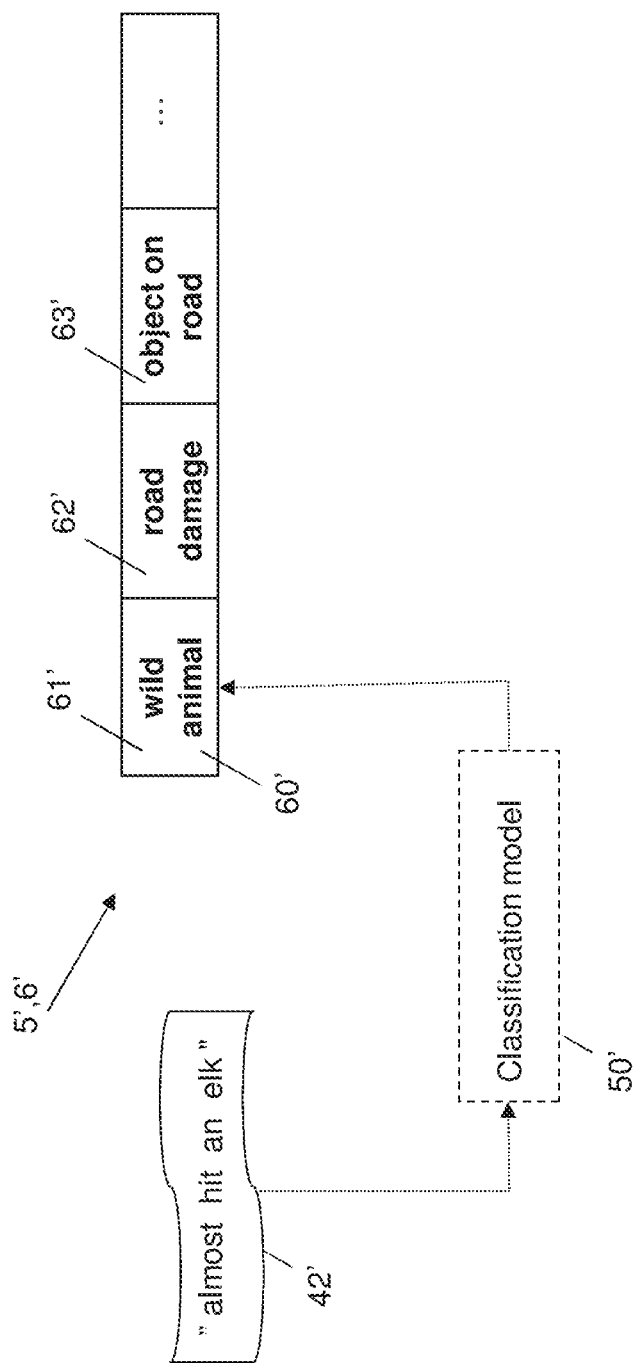
FIG. 2 illustrates a schematic overview of an implementation of the hazard reporting system according to an exemplifying embodiment of the disclosure, which may result from the conditions of FIG. 1.

It may be noted that reference characters followed by one apostrophe refer to elements resembling elements previously discussed, applicable for the exemplifying embodiment of FIG. 2. Correspondingly, reference characters followed by two apostrophes refer to elements resembling elements previously discussed, applicable for the exemplifying embodiment of FIG. 3.

In the following, according to embodiments herein which relate to enabling a vehicle occupant to in an un-distractive and dynamic manner report a hazard associated with the surroundings of a vehicle, there will be disclosed an approach which enables a safety-related incident related to the near environment of a vehicle—such as a wild animal standing next to the road along which the vehicle is travelling—to be reported by an occupant thereof—e.g. the driver—in a safe and non-restrictive manner, without taking greater focus from driving the vehicle.

Referring now to the figures and FIG. 1 in particular, there is illustrated a schematic overview of an exemplifying hazard reporting system 1 according to embodiments of the disclosure. The hazard reporting system 1, which at least partly may be comprised in an optional hazard reports control server 10, such as a cloud, is adapted for enabling a vehicle occupant to in an un-distractive and dynamic manner report a hazard associated with the surroundings of a vehicle 2. On-board the vehicle 2 is a vehicle occupant 20, here the vehicle driver, and furthermore an optional positioning system 21 and one or more optional microphones 22. The vehicle 2 is here a passenger car driving along a road 3.

Further shown is a verbal hazard report 41 from the vehicle occupant 20, which verbal hazard report 41 comprises information related to a hazard 4 associated with the surroundings of the vehicle 2, here an elk next to the road 3. The verbal hazard report 41 here comprises the exemplifying verbal expression "almost hit an elk!." Further shown is optional vehicle data 23, comprising at least a position 231 and/or travel direction 232 of the vehicle 2 valid at a time instant of receiving the verbal hazard report 41. The verbal hazard report 41 and the optional vehicle data 23 may for instance be received separately or combined by the hazard reports control server 10 via a wireless speech and/or data channel.

Additionally shown in FIG. 1 is a machine-readable hazard report 42, transformed from the verbal hazard report 41 and here thus represented by machine-readable "almost hit an elk." Further shown is a data set 5 comprising one or more hazard categories 6, and a corresponding hazard category 60—here exemplifying "wild animal"—considered corresponding to the machine-readable hazard report 42. Also shown is an optional warning message 7 provided to a second vehicle 8—here being in vicinity of the hazard 4 and driving in a direction thereto—which second vehicle 8 is selected based on the vehicle data 23. The warning message 7 comprises and/or is based on the corresponding machine-readable hazard category 60, and further comprises information based on the vehicle data 23; here the warning message 7 is represented by exemplifying "wild animal, 500 m ahead."

FIG. 2 illustrates a schematic overview of an implementation of the hazard reporting system 1 according to an exemplifying embodiment of the disclosure, which may result from the conditions of FIG. 1. Here is shown an optional classification model 50, here denoted 50', associated with the data set 5'. The data set 5' comprises one or more hazard categories 6, in the shown embodiment denoted here a first 61, a second 62 and third exemplifying hazard category 63, namely a first hazard category 61' named "wild animal", a second hazard category 62' named "road damage", a third hazard category 63' named "object on road", etc. The machine-readable hazard report 42' is in the shown embodiment represented by the phrase "almost hit an elk." The classification model 50', which will be described in greater detail in conjunction with FIG. 5 further on, is adapted to attempt to classify the machine-readable hazard report 42' into a hazard category 60' considered corresponding to the machine-readable hazard report 42'; here the first hazard category 61' is considered corresponding 60'.

Figure 3:
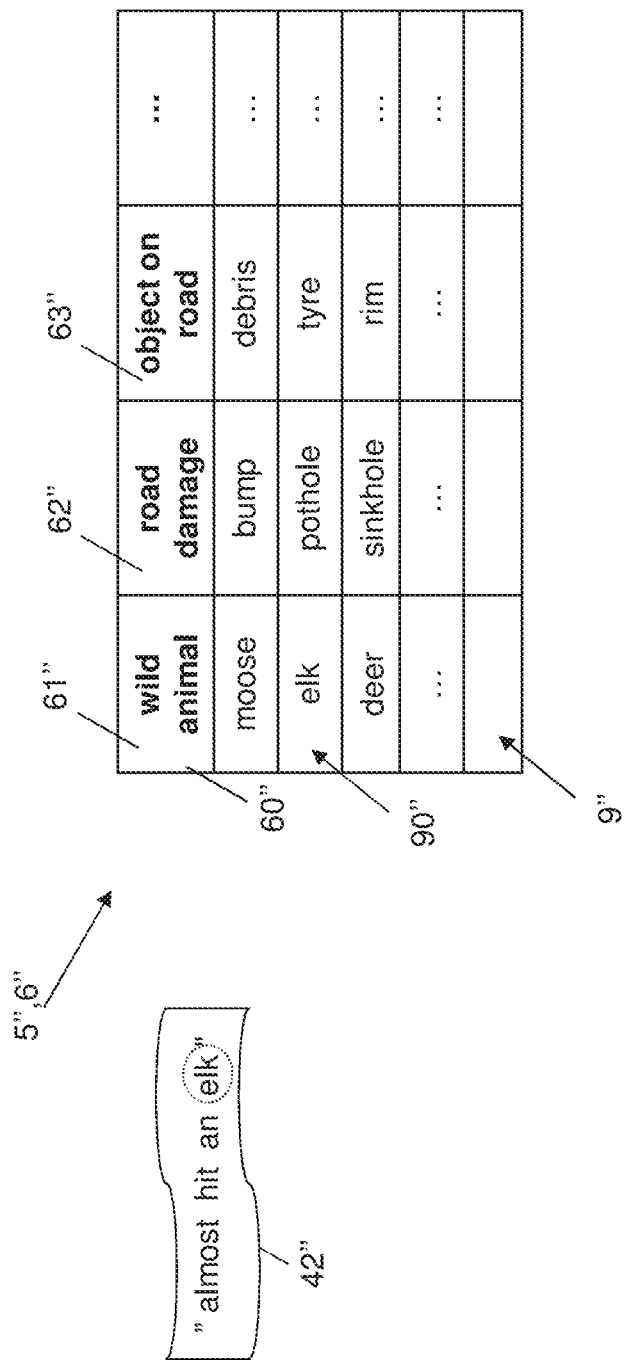
FIG. 3 illustrates a schematic overview of an alternative implementation of the hazard reporting system according to an exemplifying embodiment of the disclosure, which may result from the conditions of FIG. 1.

FIG. 3 illustrates a schematic overview of an alternative implementation of the hazard reporting system 1 according to an exemplifying embodiment of the disclosure, which may result from the conditions of FIG. 1. Here is shown at least a first hazard category 6" comprising one or more differing machine-readable elements 9, in the shown embodiment denoted 9"; here an exemplifying first hazard category 61" named "wild animal" comprising the machine-readable elements "moose", "elk", "deer", etc., an exemplifying second hazard category 62" named "road damage"

comprising the machine-readable elements "bump", "pothole", "sinkhole", etc., and an exemplifying third hazard category 63" named "object on road" comprising the machine-readable elements "debris", "tyre", "rim", etc. The machine-readable hazard report 42" is in the shown embodiment represented by "almost hit an elk", and a matching machine-readable element 90—here denoted 90"—is represented by the machine-readable element "elk" in the first hazard category 61" thus considered a corresponding hazard category 60".

Figure 4:
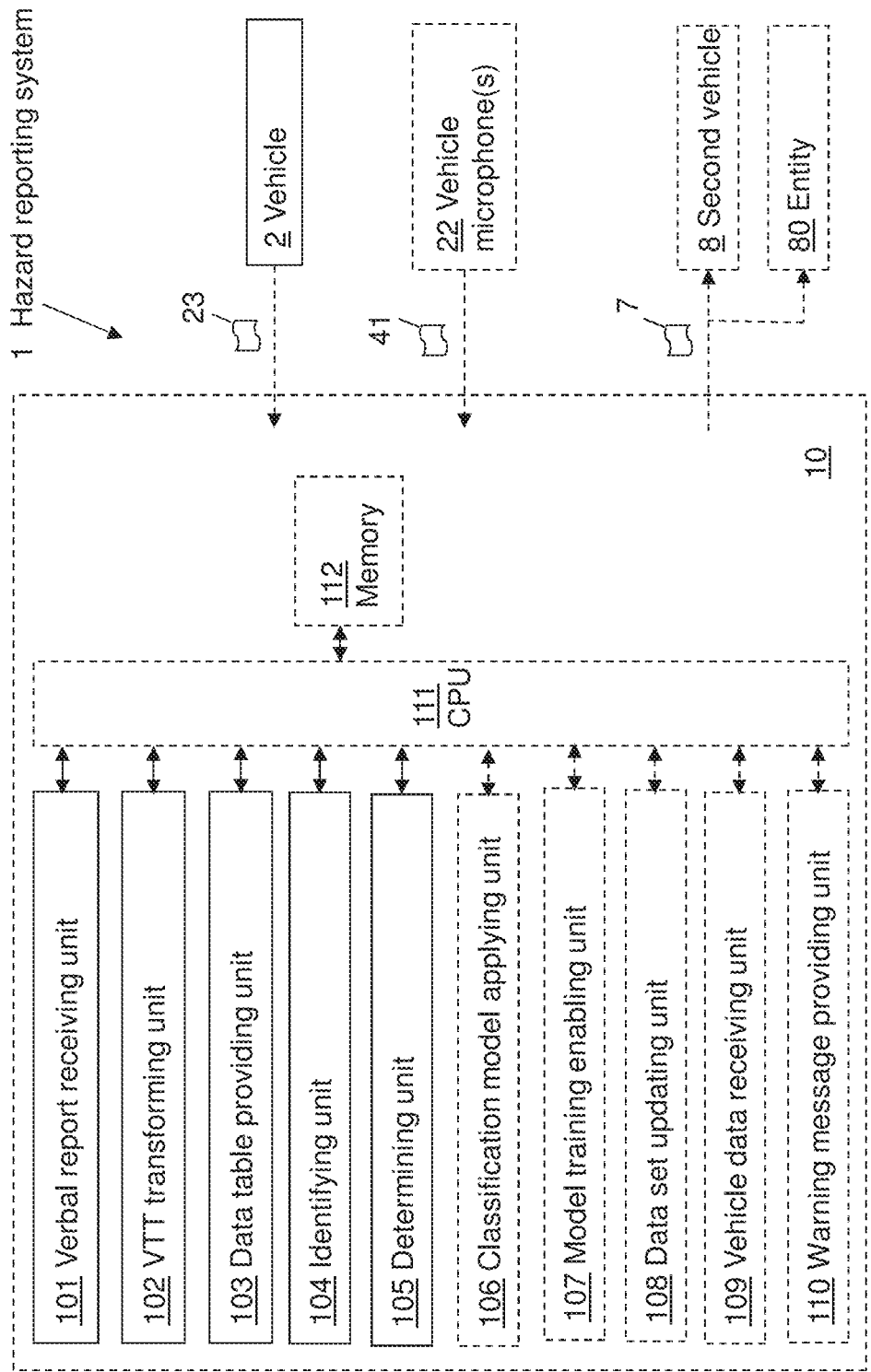
FIG. 4 is a schematic block diagram illustrating an exemplifying hazard reporting system according to embodiments of the disclosure.

As further shown FIG. 4, which depicts a schematic block diagram illustrating an exemplifying hazard reporting system 1 according to embodiments of the disclosure, the hazard reporting system 1 comprises a verbal report receiving unit 101, a VTT transforming unit 102, a data table providing unit 103, an identifying unit 104 and a determining unit 105, all of which will be described in greater detail further on. The hazard reporting system may furthermore comprise an optional classification model applying unit 106, an optional model training enabling unit 107, an optional data set updating unit 108, an optional vehicle data receiving unit 109 and/or an optional warning message providing unit 110, which similarly will be described in greater detail further on in the description.

Furthermore, the embodiments herein for enabling a vehicle occupant 20 to in an un-distractive and dynamic manner report a hazard associated with the surroundings of a vehicle 2, may be implemented through one or more processors, such as a processor 111, here denoted CPU, together with computer program code for performing the functions and actions of the embodiments herein. Said program code may also be provided as a computer program product, for instance in the form of a data carrier carrying computer program code for performing the embodiments herein when being loaded into the hazard reporting system 1. One such carrier may be in the form of a CD ROM disc. It is however feasible with other data carriers such as a memory stick. The computer program code may furthermore be provided as pure program code on a server and downloaded to the hazard reporting system 1.

The hazard reporting system 1 may further comprise a memory 112 comprising one or more memory units. The memory 112 may be arranged to be used to store e.g. information, and further to store data, configurations, schedulings, and applications, to perform the methods herein when being executed in the hazard reporting system 1. Furthermore, the verbal report receiving unit 101, the VTT transforming unit 102, the data table providing unit 103, the identifying unit 104, the determining unit 105, the optional classification model applying unit 106, the optional model training enabling unit 107, the optional data set updating unit 108, the optional vehicle data receiving unit 109, the optional warning message providing unit 110, the optional processor 111 and/or the optional memory 112 may for instance be implemented in the optional hazard reports control server 10, and/or in the vehicle 2. According to an alternative example, the hazard reporting system may be represented by a plug-in solution, such that the hazard reporting system 1 at least partly is implemented on for instance a dongle. In that manner, an aftermarket solution may be provided. Those skilled in the art will also appreciate that the verbal report receiving unit 101, the VTT transforming unit 102, the data table providing unit 103, the identifying unit 104, the determining unit 105, the optional classification model applying unit 106, the optional model training enabling unit 107, the optional data set updating unit 108, the optional vehicle data receiving unit 109 and/or the optional warning message providing unit 110 described above, and which will be described in more detail later on in this description, may refer to a combination of analog and digital circuits, and/or one or more processors configured with software and/or firmware, e.g. stored in a memory such as the memory 112, that when executed by the one or more processors such as the processor 111 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip). Further shown in FIG. 4 is the optional vehicle data 23 received directly or indirectly from the vehicle 2, the verbal hazard report 41 received for instance with support from the one or more microphones 22 of the vehicle 2, and the optional warning message 7 provided to the second vehicle 8 and/or an entity 80 e.g. represented by a road authority.

Figure 5:
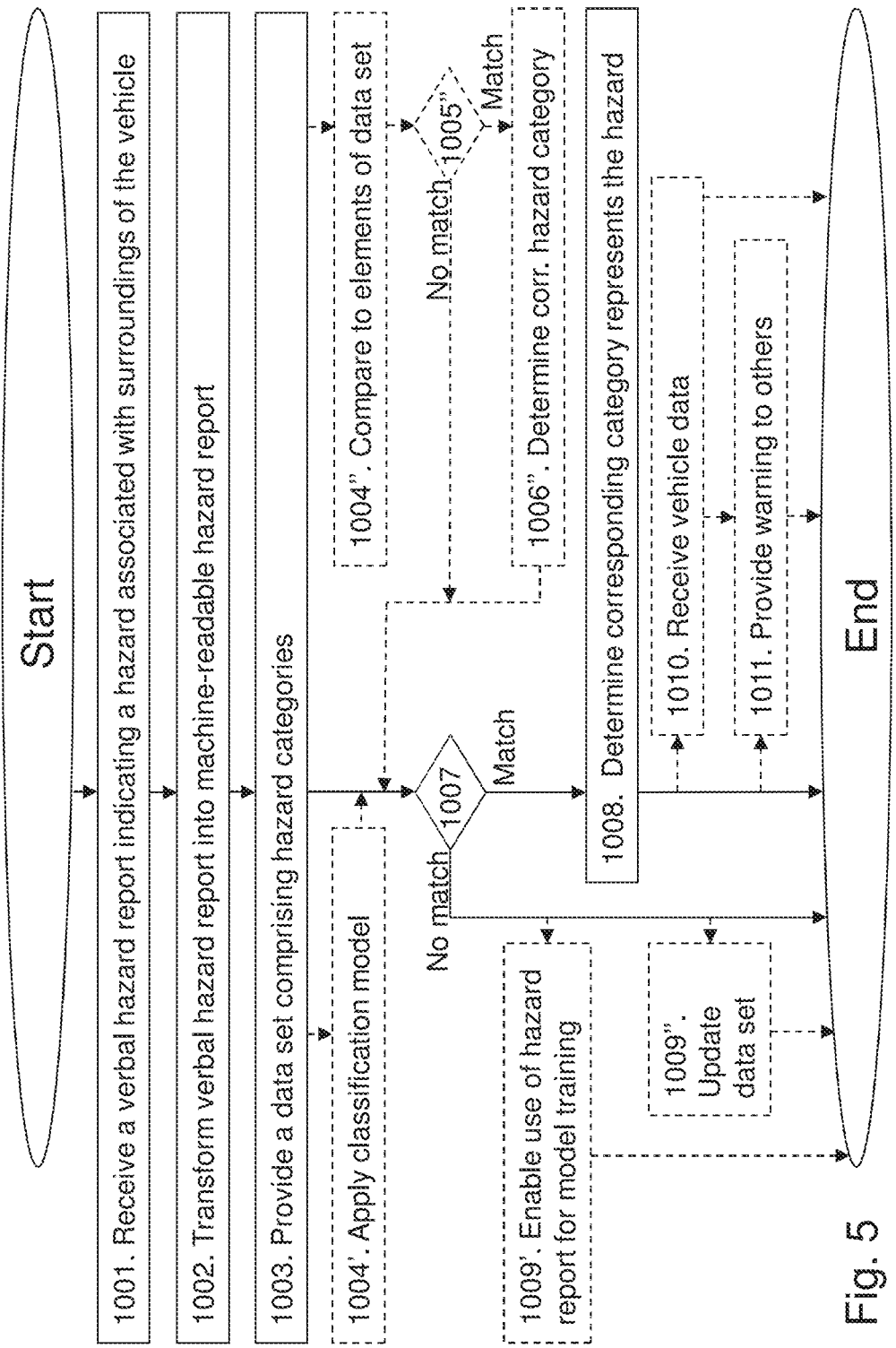
FIG. 5 is a flowchart depicting an exemplifying method for enabling a vehicle occupant to report a hazard, according to embodiments of the disclosure.

FIG. 5 is a flowchart depicting an exemplifying method for enabling a vehicle occupant 20 to report a hazard 4, according to embodiments of the disclosure. The method is performed by the hazard reporting system 1, for enabling the vehicle occupant 20 to in an un-distractive and dynamic manner report the hazard 4 associated with the surroundings of the vehicle 2. The exemplifying method, which may be continuously repeated, comprises the following actions discussed with support from FIGS. 1-4. The actions may be taken in any suitable order, for instance may optional Action 1009 and Actions 1002-1008 be performed simultaneously and/or in an alternate order.

Action 1001—In Action 1001, the hazard reporting system 1 receives—e.g. by means of the verbal report receiving unit 101—the verbal hazard report 41 from the vehicle occupant 20, which verbal hazard report 41 comprises information related to the hazard 4 associated with the surroundings of the vehicle 2. Thus, as shown with support at least from FIGS. 1 and 4, a hazard report 41 relating to a safety-related incident observed by the vehicle occupant 20 is received, which hazard report 41 is verbally and/or orally provided by the vehicle occupant 20. Accordingly, the hazard report 41 is reported in a manner un-distractive to the vehicle occupant 20, without him or her needing to in a commonly known manner interact with a touch display e.g. texting a message and/or scrolling through a pre-defined set of hazards, to be able to report the hazard. Moreover, since the hazard report 41 is verbally reported, the vehicle occupant 20 is not restricted to make a selection from a pre-defined set of hazards for instance provided in a structure menu of a touch display.

Action 1002—In Action 1002, the hazard reporting system 1 transforms—e.g. by means of the VTT transforming unit 102—with support from a speech recognition service, the verbal hazard report 41 into the resulting machine-readable hazard report 42, 42', 42". Thus, as shown with support from FIGS. 1-4, the verbal hazard report 41 is interpreted into a machine-readable hazard report 42, 42', 42", for instance a textual hazard report.

Action 1003—In Action 1003, the hazard reporting system 1 provides—e.g. by means of the data table providing unit 103—the data set 5, 5', 5" comprising the one or more hazard categories 6, 6', 6". Thus, as shown with support from FIGS. 1-4, there is made available a data set 5, 5', 5" comprising categories of different hazards 6, 6', 6" a vehicle occupant 20 may presumably observe and/or be subjected to, for instance "wild animal", "road damage", "object on road", etc.

Action 1004'—In optional Action 1004', the hazard reporting system 1 may apply—e.g. by means of the optional classification model applying unit 106—the classification model 50' associated with the data set 5', to the machine-readable hazard report 42'. The classification model 50' is adapted to attempt to classify the machine-readable hazard report 42' into a hazard category 6' considered corresponding 60' to the machine-readable hazard report 42'. Thus, as shown with support at least from FIGS. 2 and 4, a classification mechanism 50' is provided capable of categorizing—or potentially categorizing—the machine-readable hazard report 42' into a hazard category 60' deemed to correspond to the machine-readable hazard report 42', thus deemed to correspond to the verbally reported hazard 4 of the verbal hazard report 41.

Action 1004"—Alternatively, the at least first hazard category 6" may comprise one or more differing machine-readable elements 9". Thus, as shown with support at least from FIGS. 3 and 4, various elements 9" may be sub-elements to the respective one or more hazard categories 61", 62", 63". Subsequently, in optional Action 1004", the hazard reporting system 1 may compare—for instance by means of the identifying unit 104—the resulting machine-readable hazard report 42" to one or more machine-readable elements 9" of the data set 5". Thus, as shown with support at least from FIGS. 3 and 4, the verbally reported hazard 4 in the verbal hazard report 41 is—after having been transformed into a machine-readable hazard report 42"—compared to various posts 9" of the hazard categories 6".

Action 1005"—In optional Action 1005", following upon optional Action 1004", the hazard reporting system 1 attempts—for instance by means of the identifying unit 104—to identify a machine-readable element 9" considered matching 90" the machine-readable hazard report 42". Thus, as shown with support at least from FIGS. 3 and 4, it may be determined if an element 9" is deemed to match 90" the hazard report 42".

Action 1006"—In optional Action 1006", following upon optional Action 1005" when a machine-readable element considered matching 90" the machine-readable hazard report 42" is identified, the hazard reporting system 1 determines—e.g. by means of the determining unit 105—that a hazard category 6" comprising the matching machine-readable element 90", is considered corresponding 60" to the machine-readable hazard report 42". Thus, as show with support at least from FIGS. 3 and 4, a hazard category 6" of the data set 5" is—if an element 90" comprised in said hazard category 6" is deemed to match the hazard report 42"—established to be considered to correspond 60" to the machine-readable hazard report 42". Here, the first hazard category 61" is considered corresponding 60".

Action 1007—In Action 1007, the hazard reporting system 1 attempts—for instance by means of the identifying unit 104—to identify a hazard category 6, 6', 6" of the data set 5, 5', 5" considered corresponding 60, 60', 60" to the machine-readable hazard report 42, 42', 42". Thus, as shown with support from FIGS. 1-4, it may be determined if a hazard category 6, 6', 6" is deemed to correspond 60, 60', 60" to the machine-readable hazard report 42. Here, the first hazard category 61', 61" is considered corresponding 60', 60".

Action 1008—In Action 1008, following upon Action 1007 when a hazard category 6, 6', 6" of the data set 5, 5', 5" considered corresponding 60, 60', 60" to the machine-readable hazard report 42, 42', 42" is identified, the hazard reporting system 1 determines—e.g. by means of the determining unit 105—that the corresponding hazard category 60, 60', 60" represents the hazard 4 reported in the verbal hazard report 41. Thus, as shown with support from FIG. 1-4, a hazard category 61', 61" of the data set 5, 5', 5" is—if said hazard category 61', 61" is deemed to correspond 60, 60', 60" to the machine-readable hazard report 42, 42', 42"—selected to represent the reported hazard 4 of the verbal hazard report 41. Accordingly, provided that the reported hazard 4 comprised in the verbal hazard report 41 is correctly interpreted in the transformation from the verbal hazard report 41 into the computer-readable hazard report 42, 42', 42", and furthermore that a hazard category 61', 61" is considered to correspond 60, 60', 60" to the machine-readable hazard report 42, 42', 42", then said hazard category 61', 61" is selected to represent the verbally reported hazard 4. Consequently, it may thereby be concluded which safety-related incident 4 that has been reported by the vehicle occupant 20. This approach thus allows a safety-related incident 4 to be collected from e.g. a vehicle driver 20 without negative effects, and the approach is accordingly superior to solutions based on e.g. smartphone applications that require the vehicle driver 20 to interact with the phone, since such solutions may distract the vehicle driver 20 and increase the risk of a potential accident a counterproductive consequence for a solution aimed at increasing road safety.

Action 1009'—In optional Action 1009', following upon optional Action 1007 when not able to classify the machine-readable hazard report 42' into one of the hazard categories 6', the hazard reporting system 1 may enable—for instance by means of the model training enabling unit 107—the machine-readable hazard report 42' to be utilized for training the classification model 50'. Thus, as shown with support at least from FIGS. 2 and 4, the un-classifiable machine-readable hazard report 42' may be utilized for training and/or re-training of the classification model 60', possibly utilizing supervised learning and/or machine learning. Accordingly, commonly known machine learning and/or supervised learning may be utilized for continued improvement of the classification model 60', as new hazard reports 41 verbally reported by vehicle occupants 20 may provide a continuous stream of sample data for the training and evaluation of the classification model 60'.

Action 1009"—Alternatively, in optional Action 1009", following upon optional Action 1007 when not able to identify a machine-readable element 9" considered matching 90" the machine-readable hazard report 42", the hazard reporting system 1 may update—e.g. by means of the data set updating unit 108—the data set 5" to comprise a machine-readable element 9" corresponding to the machine-readable hazard report 42". Thus, as shown with support at least from FIG. 4, an un-classifiable machine-readable hazard report—or at least a portion thereof—may be added to be comprised in a new and/or already available hazard category 6" of the data set 5".

Action 1010—In optional Action 1010, the hazard reporting system 1 may receive—e.g. by means of the vehicle data receiving unit 109—vehicle data 23 of the vehicle 2, which vehicle data 23 comprises at least the position 231 and/or the travel direction 232 of the vehicle 2 valid at a time instant of receiving the verbal hazard report 41. Thus, as shown with support at least from FIGS. 1 and 4, relevant vehicle data 23—including at least the position 231 and/or travel direction 232 of the vehicle 2—valid at the time of receiving the verbal hazard report 41, may additionally be received. Accordingly, the received verbal hazard report 41 is complemented and/or combined with received digital vehicle data 23 relevant for the reported hazard 4.

Action 1011—In optional Action 1011, following upon optional Action 1010, the hazard reporting system 1 may provide—e.g. by means of the warning message providing unit 110—the warning message 7 to at least the second vehicle 8 and/or the entity 80. The warning message 7 comprises and/or is based on the corresponding machine-readable hazard category 60, 60', 60", and the warning message 7 further comprises information based on the vehicle data 23. The at least second vehicle 8 and/or the entity 80 is selected based on the vehicle data 23. Thus, as shown with support from FIGS. 1-4, other vehicles 8 and/or entities 80 may be informed of the reported hazard 4, and thus take action based thereon. For instance, other vehicles 8 in geographical nearness of the reported hazard 4 may upon receiving the warning message 7 choose to take another route to avoid the reported hazard 4 and/or pay more attention when passing the area of the reported hazard 4. Similarly, an entity 80 such as a road authority may upon receiving the warning message 7 be able to expediently take action to address the reported hazard 4.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a hazard reporting system for enabling a vehicle occupant to report a hazard associated with the surroundings of a vehicle, said method comprising:
   receiving, from the vehicle occupant via one or more microphones integrated within the vehicle, a verbal hazard reporting activation command;
   activating the hazard reporting system based on the received verbal hazard reporting activation command;
   receiving, via the one or more vehicle microphones and subsequent to activating the hazard reporting system, a verbal hazard report from said vehicle occupant, said verbal hazard report comprising information related to the hazard associated with the surroundings of said vehicle;
   transforming, with support from a speech recognition service, said verbal hazard report into a resulting machine-readable hazard report;
   providing a data set comprising one or more hazard categories,
   wherein the data set further comprises one or more sub-categories associated with each of the one or more hazard categories,
   wherein the hazard categories and sub-categories comprise differing machine-readable elements; and
   identifying a hazard category of said received verbal hazard report by comparing the machine-readable hazard report to the machine-readable elements of the data set,
   wherein identifying the hazard category of said received verbal hazard report further comprises:
   applying, in real time, a machine learning classification model associated with said data set, to said machine-readable hazard report, said machine learning classification model being adapted to classify said machine-readable hazard report into the hazard category corresponding to said machine-readable hazard report;
   determining a confidence level for the classification; and
   assigning the identified hazard category to the machine-readable hazard report when the confidence level exceeds a pre-set confidence level threshold.

2. The method according to claim 1, further comprising:
   enabling said machine-readable hazard report to be utilized for training said machine learning classification model when the confidence level is below the pre-set confidence level threshold.

3. The method according to claim 1, wherein at least a first hazard category comprises one or more differing machine-readable elements, said method further comprising:
   comparing said resulting machine-readable hazard report to one or more machine-readable elements of said data set; and
   when identifying a machine-readable element considered matching said machine-readable hazard report:
      determining that a hazard category comprising said matching machine-readable element, is considered corresponding to said machine-readable hazard report.

4. The method according to claim 3, further comprising:
   when not able to identify a machine-readable element considered matching said machine-readable hazard report:
      updating said data set to comprise a machine-readable element corresponding to said machine-readable hazard report.

5. The method according to claim 1, further comprising:
   receiving vehicle data of said vehicle, said vehicle data comprising at least a position and/or a travel direction of said vehicle valid at a time instant of receiving said verbal hazard report.

6. The method according to claim 5, further comprising:
   providing a warning message to at least a second vehicle and/or an entity, wherein said warning message comprises and/or is based on said corresponding machine-readable hazard category and wherein said warning message further comprises information based on said vehicle data, said at least second vehicle and/or entity being selected based on said vehicle data.

7. A hazard reporting system adapted for enabling a vehicle occupant to report a hazard associated with the surroundings of a vehicle, said hazard reporting system comprising:
   a verbal report receiving unit adapted for:
      receiving, from the vehicle occupant via one or more microphones integrated within the vehicle, a verbal hazard reporting activation command;
      activating the hazard reporting system based on the received verbal hazard reporting activation command;
      receiving, via the one or more vehicle microphones and subsequent to activating the hazard reporting system, a verbal hazard report from said vehicle occupant, said verbal hazard report comprising information related to the hazard associated with the surroundings of said vehicle;
   a voice to text (VTT) transforming unit adapted for transforming, with support from a speech recognition service, said verbal hazard report into a resulting machine-readable hazard report;

a data table providing unit adapted for providing a data set comprising one or more hazard categories,
wherein the data set further comprises one or more sub-categories associated with each of the one or more hazard categories,
wherein the hazard categories and sub-categories comprise differing machine-readable elements;
an identifying unit adapted for identifying a hazard category of said data set considered corresponding to said machine-readable hazard report by comparing the machine-readable hazard report to the machine-readable elements of the data set,
wherein the identifying unit is further adapted to apply, in real time, a machine learning classification model associated with said data set, to said machine-readable hazard report, said machine learning classification model being adapted to classify said machine-readable hazard report into the hazard category corresponding to said machine-readable hazard report; and
a determining unit adapted for:
   determining, when a hazard category of said data set considered corresponding to said machine-readable hazard report has been identified, that said corresponding hazard category represents the hazard reported in the verbal hazard report,
   determining a confidence level for the identified hazard category; and
   assigning the identified hazard category to the machine-readable hazard report when the confidence level exceeds a pre-set confidence level threshold.

8. The hazard reporting system according to claim 7, further comprising:
a model training enabling unit adapted for enabling, when the confidence level is below the pre-set confidence threshold, said machine-readable hazard report to be utilized for training said machine learning classification model.

9. The hazard reporting system according to claim 7, wherein at least a first hazard category comprises one or more differing machine-readable elements,
wherein said identifying unit further is adapted for comparing said resulting machine-readable hazard report to one or more machine-readable elements of said data set;
wherein said identifying unit further is adapted for identifying a machine-readable element considered matching said machine-readable hazard report; and
wherein said determining unit further is adapted for determining, when a machine-readable element considered matching said machine-readable hazard report has been identified, that a hazard category comprising said matching machine-readable element, is considered corresponding to said machine-readable hazard report.

10. The hazard reporting system according to claim 9, further comprising:
a data set updating unit adapted for updating, when a machine-readable element considered matching said machine-readable hazard report not has been identified, said data set to comprise a machine-readable element corresponding to said machine-readable hazard report.

11. The hazard reporting system according to claim 7, further comprising:
a vehicle data receiving unit adapted for receiving vehicle data of said vehicle, said vehicle data comprising at least a position and/or a travel direction of said vehicle valid at a time instant of receiving said verbal hazard report.

12. The hazard reporting system according to claim 11, further comprising:
a warning message providing unit adapted for providing a warning message to at least a second vehicle and/or an entity, wherein said warning message comprises and/or is based on said corresponding machine-readable hazard category and wherein said warning message further comprises information based on said vehicle data, said at least second vehicle and/or entity being selected based on said vehicle data.

13. A non-transitory computer-readable medium having stored thereon sequences of instructions which, when executed by at least one processor, cause the at least one processor to perform a method for enabling a vehicle occupant to report a hazard associated with the surroundings of a vehicle, said method comprising:
receiving, from the vehicle occupant via one or more microphones integrated within the vehicle, a verbal hazard reporting activation command;
activating the hazard reporting system based on the received verbal hazard reporting activation command;
receiving, via the one or more vehicle microphones and subsequent to activating the hazard reporting system, a verbal hazard report from said vehicle occupant, said verbal hazard report comprising information related to the hazard associated with the surroundings of said vehicle;
transforming, with support from a speech recognition service, said verbal hazard report into a resulting machine-readable hazard report;
providing a data set comprising one or more hazard categories,
wherein the data set further comprises one or more sub-categories associated with each of the one or more hazard categories,
wherein the hazard categories and sub-categories comprise differing machine-readable elements; and
identifying a hazard category of said received verbal hazard report by comparing the machine-readable hazard report to the machine-readable elements of the data set,
wherein identifying the hazard category of said received verbal hazard report further comprises:
applying, in real time, a machine learning classification model associated with said data set, to said machine-readable hazard report, said machine learning classification model being adapted to classify said machine-readable hazard report into the hazard category corresponding to said machine-readable hazard report;
determining a confidence level for the classification; and
assigning the identified hazard category to the machine-readable hazard report when the confidence level exceeds a pre-set confidence level threshold.

* * * * *